(12) United States Patent
Laukhuff et al.

(10) Patent No.: US 9,375,753 B2
(45) Date of Patent: *Jun. 28, 2016

(54) METHODS FOR PREPARING MULTILAYER COMPOSITES USING CALENDERED FILMS AND PRODUCTS PRODUCED FROM SAME

(71) Applicant: Armstrong World Industries, Inc., Lancaster, PA (US)

(72) Inventors: Barbara L. Laukhuff, Mount Joy, PA (US); Lawrence C. Neeper, Stillwater, OK (US)

(73) Assignee: AFI Licensing LLC, Lancaster, PA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/139,526

(22) Filed: Dec. 23, 2013

(65) Prior Publication Data

US 2015/0176275 A1 Jun. 25, 2015

(51) Int. Cl.
| | |
|---|---|
| *B05D 3/12* | (2006.01) |
| *B32B 37/18* | (2006.01) |
| *B32B 37/24* | (2006.01) |
| *B05D 7/00* | (2006.01) |
| *B32B 17/02* | (2006.01) |
| B32B 38/06 | (2006.01) |
| E04B 5/02 | (2006.01) |
| E04F 15/10 | (2006.01) |
| E04F 15/16 | (2006.01) |

(52) U.S. Cl.
CPC .. *B05D 3/12* (2013.01); *B05D 7/50* (2013.01); *B32B 17/02* (2013.01); *B32B 37/18* (2013.01); *B32B 37/24* (2013.01); *B05D 2203/35* (2013.01); *B05D 2252/00* (2013.01); *B05D 2506/25* (2013.01); *B05D 2507/01* (2013.01); *B05D 2507/02* (2013.01); *B05D 2508/00* (2013.01); *B05D 2530/00* (2013.01); *B32B 38/06* (2013.01); *B32B 2037/243* (2013.01); *B32B 2305/022* (2013.01); *B32B 2309/105* (2013.01); *B32B 2315/085* (2013.01); *B32B 2471/00* (2013.01); *E04B 5/026* (2013.01); *E04F 15/105* (2013.01); *E04F 15/107* (2013.01); *E04F 15/163* (2013.01); *Y10T 156/10* (2015.01); *Y10T 156/1041* (2015.01); *Y10T 428/239* (2015.01)

(58) Field of Classification Search
None
See application file for complete search history.

(56) References Cited

U.S. PATENT DOCUMENTS

| | | | |
|---|---|---|---|
| 5,495,935 A | 3/1996 | Zabron et al. | |
| 6,413,618 B1 | 7/2002 | Parker et al. | |
| 6,444,075 B1 * | 9/2002 | Schneider | B32B 3/00 156/242 |
| 6,475,313 B1 | 11/2002 | Peterson et al. | |

(Continued)

FOREIGN PATENT DOCUMENTS

| | | |
|---|---|---|
| CA | 2133522 | 4/1996 |
| EP | 1362695 B1 | 7/2006 |

OTHER PUBLICATIONS

"The Fundamentals of Fiberglass," retrieved from http://www.fibreglast.com/product/the-fundamentals-of-fiberglass/Learning_Center on Nov. 29, 2015, 8 pages.*

*Primary Examiner* — William Phillip Fletcher, III

(57) ABSTRACT

Described herein are methods for preparing multilayer composites comprising a fiberglass substrate encapsulated, at least in part, by a calendered film; along with products produced from same. The methods improve the efficiency of the manufacturing process and provide a product with improved performance characteristics.

15 Claims, 2 Drawing Sheets

(56) References Cited

U.S. PATENT DOCUMENTS

| | | | |
|---|---|---|---|
| 6,511,926 B1 * | 1/2003 | Kauffman | B32B 27/08 428/203 |
| 6,591,560 B2 | 7/2003 | Burke, III et al. | |
| 6,649,248 B1 | 11/2003 | Schneider et al. | |
| 2003/0215618 A1 * | 11/2003 | Hynicka | B32B 27/12 428/196 |
| 2009/0029097 A1 * | 1/2009 | Riddle | C08G 18/2815 428/95 |

* cited by examiner

METHODS FOR PREPARING MULTILAYER COMPOSITES USING CALENDERED FILMS AND PRODUCTS PRODUCED FROM SAME

BACKGROUND

Conventional methods of manufacturing multilayer composites used in flooring products, including vinyl flooring sheet products, e.g., flooring tiles and planks, have numerous drawbacks, including, inter alia: (1) interaction of the encapsulating materials with the oven belt; (2) "ink blocking", which occurs when the ink printed on a particular layer sticks to the back side of the sheet when it is rolled up; and (3) poor durability and dimensional stability. Such flooring composites need to have long durability, including improved resistance to abrasion, indentation and staining, since the composites are directly exposed to constant abrasion, pressure and staining resulting from normal use. Embodiments of the present invention are directed to these and other ends.

SUMMARY

In some embodiments, the present invention provides methods for preparing a multilayer composite comprising: providing a fiberglass substrate; applying a calendered film to a first major surface of the fiberglass substrate such that at least a portion of the fiberglass substrate remains exposed after the calendered film is applied to the first major surface of the fiberglass substrate; applying a foamable resin to the second major surface of the fiberglass substrate.

Some embodiments of the present invention provide a product prepared by any one of the methods described herein. Some embodiments provide a flooring product, e.g., flooring tile, plank, or sheet, described herein.

DETAILED DESCRIPTION

Figure 1:
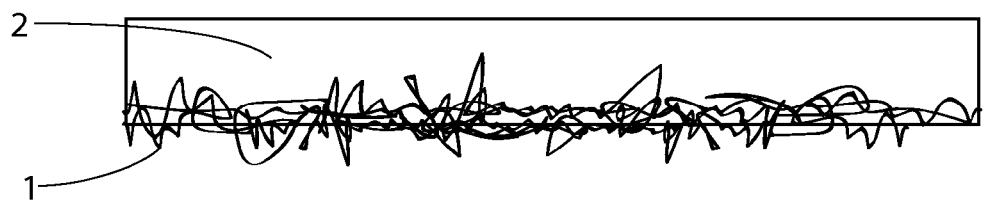
FIG. 1 depicts a composite prepared by an exemplary method of the present invention wherein a calendered film is applied to a fiberglass substrate to partially encapsulate the substrate in the calendered film.
Figure 2:
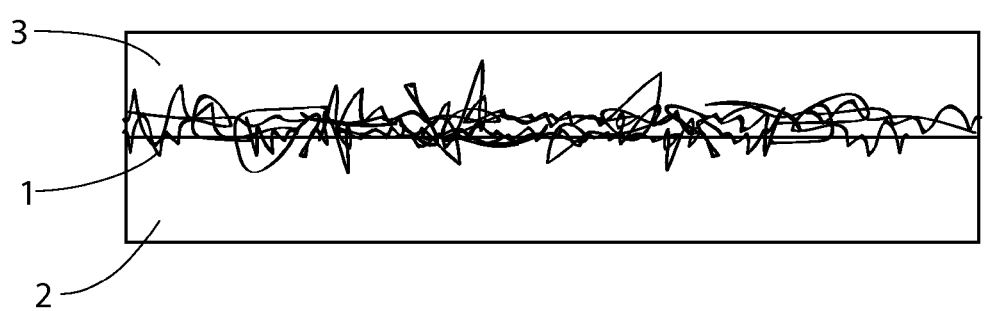
FIG. 2 depicts a composite prepared by an exemplary method of the present invention wherein a foamable resin has been applied to the partially encapsulated fiberglass substrate.

As used herein, the terms "hot melt calendering" or "HMC" refer to a process of formulating a homogeneous mixture containing a resin and optionally a plasticizer, filler, stabilizer and a blowing agent, heating the mixture and sending it to a calendar where the mixture is applied in a precisely controlled thickness to a substrate.

As used herein, the terms "encapsulated" or "encapsulating" may be used interchangeably.

As used herein the abbreviation "fpm" refers to feet per minute.

As used herein, the term "wipe ratio" refers to the ratio of speed of the coater applicator roll and the linespeed. The higher the wipe ratio, the less voids in the foamable coating. The purpose is to produce a smooth surface for printing.

In some embodiments, the present invention provides methods for preparing a multilayer composite comprising: providing a fiberglass substrate 1; applying a calendered film 2 to a first major surface of the fiberglass substrate 1 such that at least a portion of the second major substrate of the fiberglass substrate 1 remains exposed after the calendered film 2 is applied to the first major surface of the fiberglass substrate 1; and applying a foamable resin layer 3 to the second major surface of the fiberglass substrate 1. In some embodiments, after the first major surface is applied with the calendered film 2, the composite structure is rotated to upwardly expose the second major surface of the fiberglass substrate. The foamable resin layer is then applied on the second major surface of the fiberglass substrate 1, encapsulating the fiberglass substrate 1 between the calendered film 2 and the foamable resin layer 3.

In some embodiments, the foamable resin layer 3 comprises a formable plastisol, which is gelled (solidified) by exposing the composite with the foamable plastisol layer to heat. The exposed surface of the gelled plastisol layer may then be decorated with standard rotogravure ink compositions or other ink printing processes prior to further processing the composite. Some embodiments further comprise the step of applying a coating 4 on the foamable resin layer. In some embodiments, the methods further comprise the step of embossing the foamable resin layer 3 before or after the coating 4 is applied. Still other embodiments further comprise the step of applying a coating 4 to the embossed calendered film layer.

In some embodiments, the coating 4 is transparent or translucent. In some embodiments, the coating is transparent. In some embodiments, the coating 4 is translucent. In some embodiments, the coating 4 comprises a vinyl plastisol.

Some embodiments further comprise the step of foaming the composite in an oven. In some embodiments, the composite is exposed to temperatures in excess of 250° C. F to foam the applied foamable layer 3 and to cure the coating 4.

In some embodiments, the calendered film 2 adheres to the fiberglass substrate 1 in the absence of an adhesive.

In some embodiments, the calendered film layer 2 comprises a composition comprising a melt processable resin. In some embodiments, the melt processable polymer formulation is selected from: polyvinyl chloride, polyethylene, polypropylene, polystyrene, polycarbonate, polyester, polyvinyl acetate, thermoplastic elastomer, e.g., acrylonitrile butadiene styrene, a copolymer thereof, and a combination of two or more thereof.

In some embodiments, the composition comprising a melt processable resin can be applied via melt calender equipment in widths limited only by equipment and substrate availability. In some embodiments, a melt processable polymer resin composition is delivered as a molten extrudate to a three roll calender. In some embodiments, the melt processable resin composition is further softened in the three roll calender by the heated rolls. In some embodiments, the thickness of the calendered film 2 is determined by the gap between the second roll and the third roll.

In some embodiments, the fiberglass substrate 1 is preheated by a heater. In some embodiments, the calendered film 2 is applied to the preheated substrate between the third roll and the conformable pressure roll to form a multilayered composite in which the melt processable resin composition forms a layer, having substantially uniform thickness, adjacent to the fiberglass substrate 1. In some embodiments, the conformable pressure roll deters air entrapment between the melt processable resin composition and the fiberglass substrate 1.

In some embodiments, the melt processable composition is introduced as a film. In some embodiments, the film is subsequently melted or softened and applied to the fiberglass substrate 1 with a calender, including a two roll calender, or heated drum and conformable pressure roll, such as a rubber roll.

In some embodiments, a film comprising a melt processable resin composition is introduced to a conformable rubber pressure roll and onto a heated drum in such a manner to eliminate entrapment of air between the film and drum. In some embodiments, the film is heated by the drum to melt the film or put it in a softened condition approaching melt. In some embodiments, the fiberglass substrate 1 is preheated by heater, and then the film is melt applied to the preheated fiberglass substrate between a heated drum and a second rubber pressure roll to form a composite.

In some embodiments, the composite has a thickness of from about 40 mils to about 75 mils. In some embodiments, the composite has a thickness of from about 55 mils to about 65 mils.

In some embodiments, the calendered film layer 2 has a thickness of from about 10 mils to about 20 mils. In some embodiments, the calendered film layer 2 has a thickness of from about 12 mils to about 17 mils.

In some embodiments, the coating 4 has a thickness of from about 5 mils to about 15 mils. In some embodiments, the coating 4 has a thickness of about 10 mils. In some embodiments, the coating 4 has a thickness of 9.5 mils.

In other embodiments, at least a portion of the calendered film layer 2 protrudes through the second major surface of the fiberglass substrate.

In some embodiments, at least a portion of the foamable resin layer 3 is in contact with the calendered film layer 2.

In some embodiments, the calendered film layer 2 and/or the foamable resin layer 3 further comprises a filler. In some embodiments, the filler is selected from limestone, clay, talc, dolomite, and a combination of two or more thereof. In some embodiments, the filler comprises limestone.

In some embodiments, the foamable resin layer 3 has a wipe ratio of greater than 1.9:1.

In some embodiments, the calendered film layer 2 is applied to the substrate at a line speed of from about 40 to about 160 fpm. In some embodiments, the calendered film layer 2 is applied to the substrate at a line speed of about 100 fpm.

In some embodiments, the specified viscosity range corresponds to a temperature range of 425° F. to 225° F. In some embodiments, wherein the viscosity is from about C to about D (E to F). In this range the melt composition bonds well to the substrate and it flows to conform well to the fiberglass substrate 1 while substantially maintaining a uniform thickness. In some embodiments, the applied hot melt composition cools rapidly on the fiberglass substrate 1 avoiding distortion of the fiberglass substrate 1, though the melt temperature of the fiberglass substrate 1 may be similar to that of the hot melt composition which is applied.

In some embodiments, the substrate 1 is a non-woven fabric. In some embodiments the substrate 1 is produced from an inorganic substrate. In some embodiments, the substrate 1 comprises mineral wool, slag wool, rock wool, or a combination of two or more thereof. In some embodiments, the fiberglass substrate 1 comprises a fiberglass veil. In some embodiments, the fiberglass substrate 1 comprises a mixture of fiberglass and a polymer fiber such as polyest fiber, e.g., polyethylene terephthalate.

In some embodiments, the foamable resin layer 3 is embossed at a line speed of from about 100 fpm to about 200 fpm. In some embodiments, the foamable resin layer 3 is embossed at a line speed of about 140 fpm. In some embodiments, the foamable resin layer 3 is embossed with an ink comprising a high molecular weight resin.

In some embodiments, the calendered film layer 2 further comprises a plasticizer. In some embodiments, the calendered film layer 2 further comprises a phthalate free plasticizer.

In some embodiments, the calendered film layer 2 is applied to the fiberglass substrate 1 at a pressure of from about 10 pli to about 200 pli. In some embodiments, the calendered film layer 2 is applied to the fiberglass substrate 1 at a pressure of from about 30 pli to about 200 pli. In some embodiments, the calendered film layer 2 is applied to the fiberglass substrate 1 at a pressure of from about 10 pli to about 100 pli. In some embodiments, the calendered film layer 2 is applied to the fiberglass substrate 1 at a pressure of about 40 pli.

Figure 3:
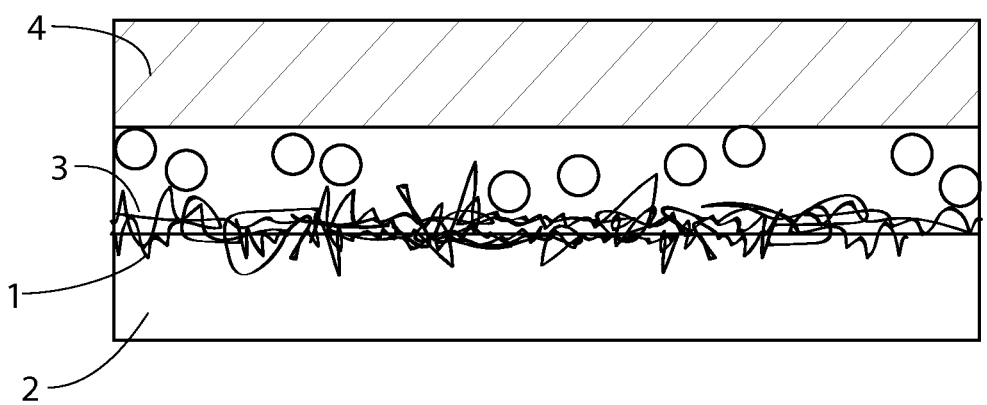
FIG. 3 depicts a composite prepared by an exemplary method of the present invention wherein a coating has been applied to the foamable resin layer after the foamable resin layer has been embossed.

Some embodiments provide a product produced by any one of the methods described herein. An exemplary composite flooring sheet product is illustrated in FIG. 3. The composite structure has a fiberglass veil encapsulated with an HMC layer and a foamed resin layer, such as foamed polyvinyl chloride. The foamed resin layer is also protected with a coating layer, such as polyvinyl chloride film layer form from plastisol. The resulting composite sheet is dimensionally stable and not impacted by ambient moisture. When the composite is used as a flooring, the dimensionally stable structure can be installed without using an adhesive, unlike a conventional flooring sheet with a felt backing. In addition, the composite sheet with the HMC layers provides improved performance and durability compared to conventional vinyl flooring composite sheet.

EXAMPLES

Example 1

Described below in Table 1 are exemplary compositions which comprise the calendered film layer.

TABLE 1

| Ingredients | I | II | III |
|---|---|---|---|
| | | Wt. % | |
| Limestone | 63.00 | 63.00 | 63.00 |
| Polyvinyl chloride homopolymer resin | 25.73 | 25.86 | 25.60 |
| Dioctyl terephthalate | 9.00 | 9.20 | 8.92 |
| Processing aid | 0.21 | 0.00 | 0.41 |
| Epoxidized soy bean oil | 0.82 | 0.82 | 0.82 |
| Calcium zinc phosphate | 0.50 | 0.50 | 0.50 |
| Calcium stearate | 0.74 | 0.75 | 0.75 |

The above HMC formulations are compounded in a high intensity mixer, and then fed into a calendar (top roll 340° F. and transfer roll 350° F.) at a mixture temperature of 380° F. The HMC is directly melt coated onto a 20 mils fiberglass veil to form a 20 mils thick HMC layer. The resulting composite is flipped over, and a 10 mils foamable vinyl plastisol composition (2:1 blow ratio) is coated with a reverse roll coater on the exposed fiberglass veil. The coated vinyl plastisol is gelled by bringing it in contact with a hot drum at 300° F. The foamable plastisol composition contains PVC homopolymer foam dispersion resin—K65 31.5%, PVC homopolymer blending resin 25.7%, limestone filler 12.6%, $TiO_2$ 3.2%, activated blowing agent 0.9%, dioctyl terephthalate plasticizer 22.6%, hydrocarbon diluent 2.8% and epoxidized soya oil 0.7%. The gelled foamable layer is subsequently printed with standard rotogravure ink compositions in a selected design using inhibitor and non-inhibitor compositions. A 10 mils thick transparent vinyl plastisol composition is coated onto this printed composite by reverse roll coating, and the entire composite is heated in an air impingement oven such that the surface temperature of the composite reached 370° F., thereby expanding the foamable plastisol layer to produce a chemically embossed flooring structure. Each of the final composites has a thickness of about 55 mils.

Example 2

Appliance Foot Drag Test

The purpose of the Appliance Foot Drag Test is to determine a flooring product's resistance to tearing when an appliance foot is dragged or pushed across its surface. Samples are subjected to one (1) pass of a refrigerator foot mounted on an aluminum base and attached to a slide apparatus at a given weight. The foot used is a standard refrigerator leveling foot that has six sides with rounded corners. The maximum dimension is 1.5 inches from a point at the juncture of any two adjacent sides through the center to the opposite point.

Four (4) 5-inch wide×20-inch long specimens of a various flooring products are prepared, with the 20-inch length in the machine direction. The flooring products are adhered to a subflooring material according to appropriate installation procedure. A 2-inch strip of double-faced cloth carpet tape is placed on the back of each specimen over its entire length, in the center of the specimen.

A slide apparatus moves along the surface of the specimen at the rate of 30 inches in five seconds. The specimens are affixed to the slide table so that refrigerator foot will slide down the middle of the specimen. The refrigerator foot bar is secured to slide wells. The weight plates are lowered onto the specimen. The weight may be allowed to rest on the specimen for 20 seconds before start of the test.

Additional weight is added onto the top of the weight plates. The testing apparatus is activated and a single pass of the refrigerator foot is made down the length of the specimen. The weights are removed from the apparatus and refrigerator foot is moved back to the starting point.

The specimen is inspected for any failure, i.e., any break in wear surface. Weight is added or subtracted according to results. The process is repeated until the specimen tears. The weight at which tearing takes place is noted, and this represents the reported value.

The data described in Table 2 (below) demonstrates that flooring products prepared using an exemplary method of the present invention significantly outperformed similarly structured and constituted flooring products prepared using conventional methods of preparation, in an Appliance Foot Drag Test.

TABLE 2

|  | I | II | III | Comp. Ex. I | Comp. Ex. II | Comp. Ex. III |
|---|---|---|---|---|---|---|
|  |  |  |  | Pounds |  |  |
| Wt. Required to Tear Specimen | 112 | 132 | 157 | 77 | 80 | 84 |

Comp. Ex I is a residential vinyl flooring sheet (Shaw Duratru) having a 60 mils thickness
Comp. Ex II is a commercial vinyl flooring sheet (Tarkett Proline) having a 72 mils thickness
Comp. Ex III is a commercial vinyl flooring sheet (IVC Level 10) having a 70 mils thickness It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. A method for preparing a multilayer composite comprising:
   providing a fiberglass substrate;
   applying a calendered film to a first major surface of the fiberglass substrate such that at least a portion of the fiberglass substrate remains exposed after the calendered film is applied to the first major surface of the fiberglass substrate; and
   applying a foamable resin to a second major surface of the fiberglass substrate,
   wherein at least a portion of the foamable resin layer is in contact with said calendered film layer.

2. The method of claim 1, further comprising the step of embossing the foamable resin layer.

3. The method of claim 2, further comprising applying a coating to the embossed foamable resin layer.

4. The method of claim 1, wherein the calendered film adheres to the fiberglass substrate in the absence of an adhesive.

5. The method of claim 1, wherein the calendered film layer comprises a composition comprising a melt processable resin selected from the group consisting of: polyvinyl chloride, polyethylene, polypropylene, polystyrene, polycarbonate, polyester, rubber, polyvinyl acetate, acrylonitrile butadiene styrene, a copolymer thereof, and a combination of two or more thereof.

6. The method of claim 1, wherein the calendered layer has a thickness of from about 10 mils to about 20 mils.

7. The method of claim 1, wherein the calendered film layer further comprises a filler selected from the group consisting of limestone, clay, talc, dolomite, and a combination of two or more thereof.

8. The method of claim 1, wherein the calendered film layer is applied to the substrate at a line speed of from about 50 to about 100 fpm.

9. The method of claim 1, wherein the fiberglass substrate comprises a glass veil.

10. The method of claim 1, wherein the foamable resin comprises a plastisol.

11. The method of claim 1, wherein the fiberglass substrate is flipped prior to application of the foamable resin.

12. A method for preparing a multilayer composite comprising:
   providing a fiberglass substrate;
   applying a calendered film to a first major surface of the fiberglass substrate such that at least a portion of the fiberglass substrate remains exposed after the calendered film is applied to the first major surface of the fiberglass substrate;
   applying a foamable resin to a second major surface of the fiberglass substrate; and
   further comprising the step of embossing the foamable resin layer and embossing the calendered film layer.

13. The method of claim 12, further comprising applying a coating to the embossed calendered film layer.

14. The method of claim 12, wherein the foamable resin layer is embossed at a line speed of from about 100 fpm to about 200 fpm.

15. A method for preparing a multilayer composite comprising:
   providing a fiberglass substrate;

applying a calendered film to a first major surface of the fiberglass substrate such that at least a portion of the fiberglass substrate remains exposed after the calendered film is applied to the first major surface of the fiberglass substrate; and applying a foamable resin to a second major surface of the fiberglass substrate, wherein at least a portion of the calendered film layer protrudes through the second major surface of the fiberglass substrate.

\* \* \* \* \*